June 8, 1965 S. HERTSCHE 3,187,442
EDUCATIONAL DEVICE
Filed June 27, 1961 7 Sheets-Sheet 1
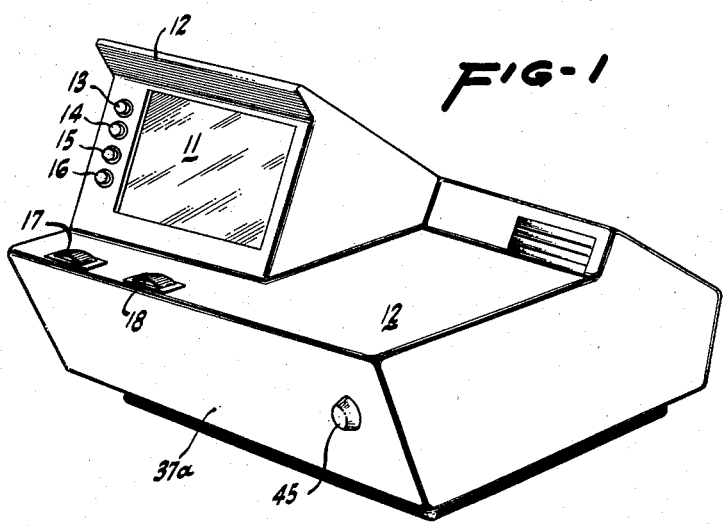
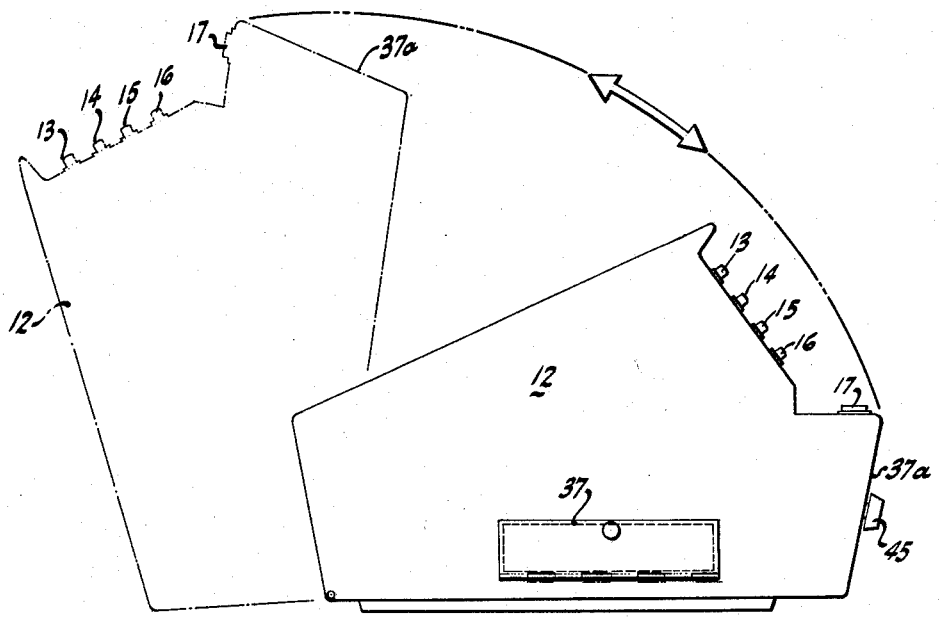
INVENTOR.
STACY HERTSCHE
BY
ATTORNEY

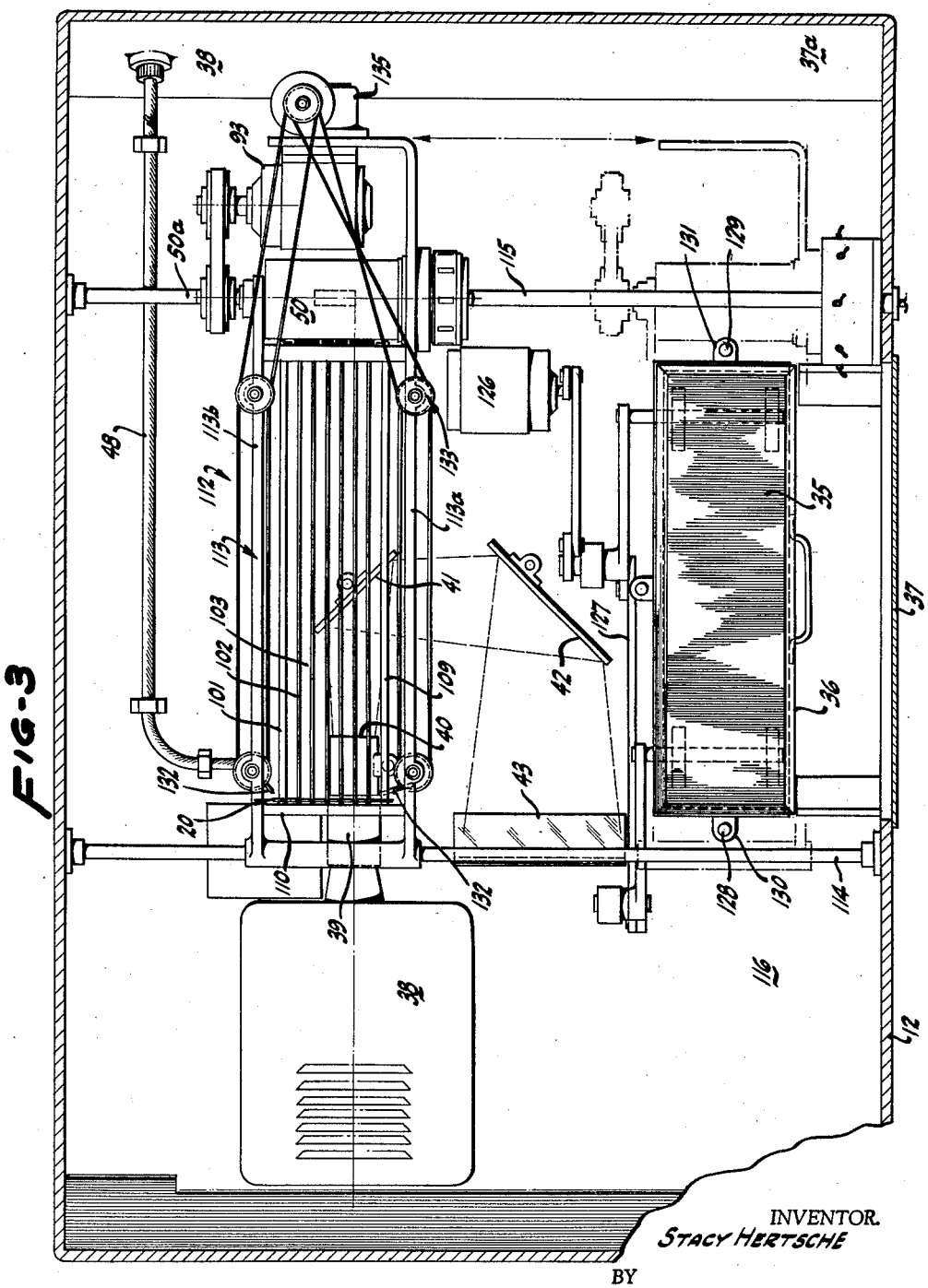

June 8, 1965  S. HERTSCHE  3,187,442
EDUCATIONAL DEVICE
Filed June 27, 1961  7 Sheets-Sheet 3

INVENTOR.
STACY HERTSCHE
BY
Edward B. Gregg
ATTORNEY

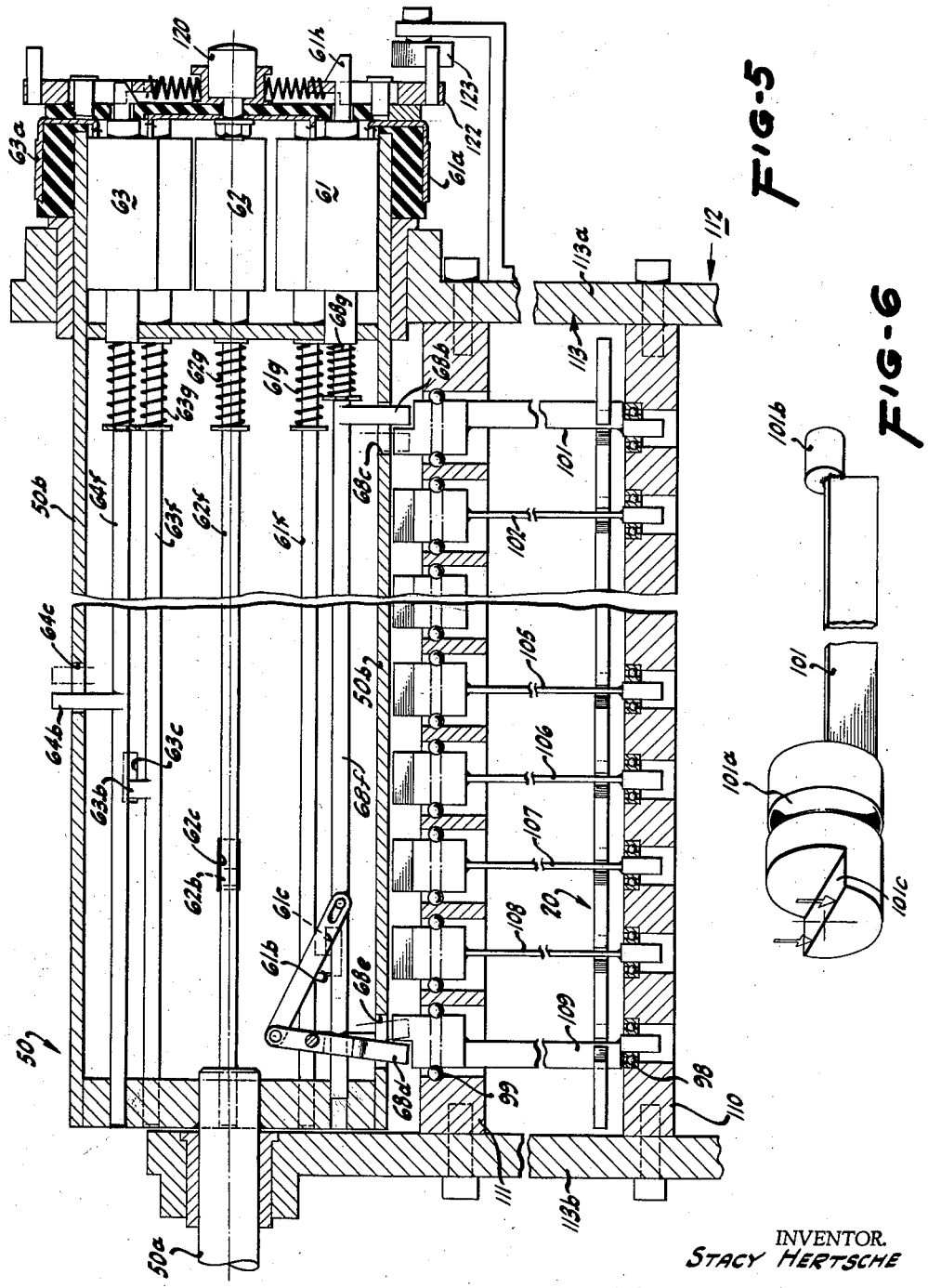

June 8, 1965 S. HERTSCHE 3,187,442
EDUCATIONAL DEVICE
Filed June 27, 1961 7 Sheets-Sheet 5

INVENTOR.
STACY HERTSCHE
BY
Edward B. Gregg
ATTORNEY

June 8, 1965
S. HERTSCHE
3,187,442
EDUCATIONAL DEVICE
Filed June 27, 1961
7 Sheets—Sheet 7
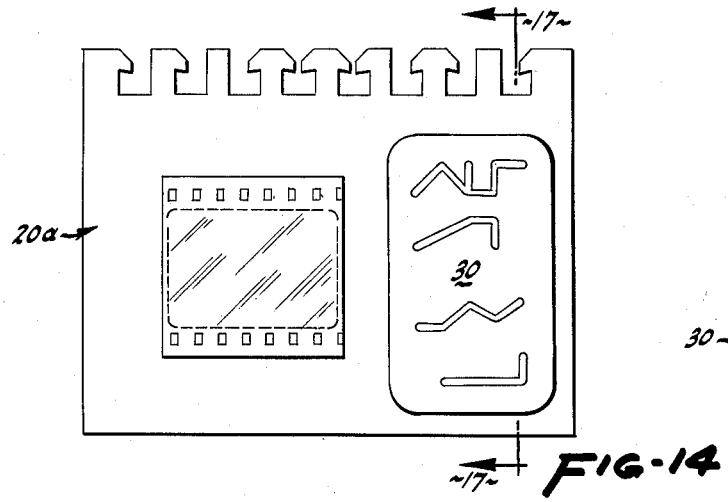
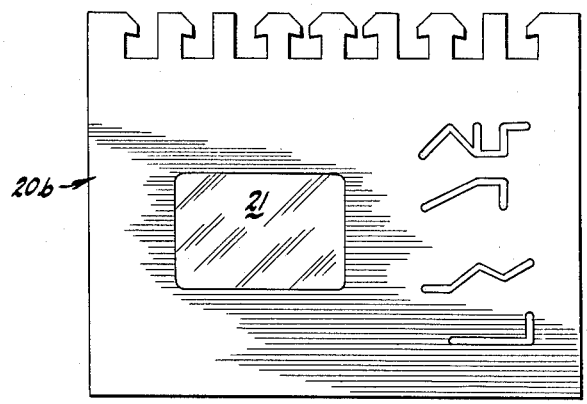
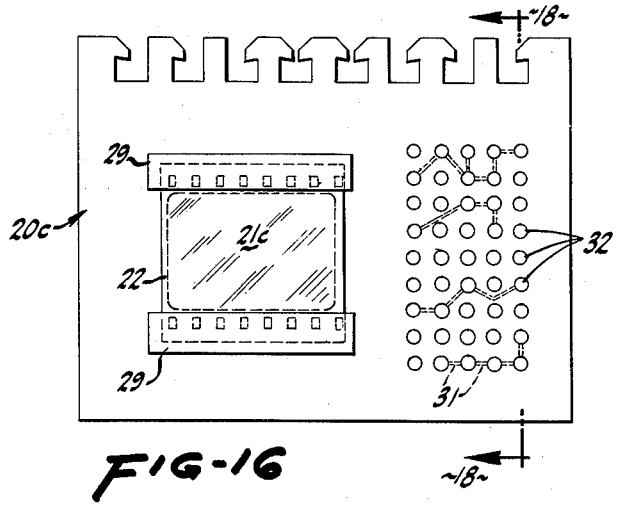
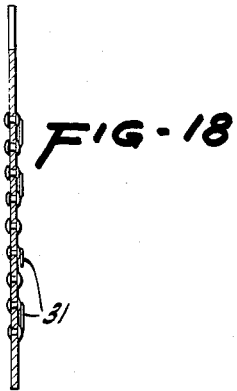
INVENTOR.
STACY HERTSCHE
BY
ATTORNEY

United States Patent Office 3,187,442
Patented June 8, 1965

3,187,442
EDUCATIONAL DEVICE
Stacy Hertsche, 424 Waverley St., Menlo Park, Calif.
Filed June 27, 1961, Ser. No. 120,030
6 Claims. (Cl. 35—9)

The present invention relates to educational devices.

More particularly this invention relates to teaching machines by which an educational subject is made available as sequential bits of information to a student who checks his progress in learning the information by selecting one of a plurality of possible answers.

It is an object of the invention to provide a teaching machine in which an educational subject is made sequentially available to a student in a set or deck of cards, with each card containing a photographic bit of information that is visually presented to a student; the student's response to questions based on each information bit triggers an advance or regression to the next card programmed in the deck.

It is a more particular object of the invention to provide a novel teaching machine that permits random access to any information bit formed integral with a card that includes not only indexing means for random access thereto but also a printed electrical circuit for controlling operation of the subsequent card-selection mechanism of said teaching machine. A student responds to the information bit on a card by selecting one of a plurality of answers presented therewith; this selection initiates operation of the machine to present the next appropriate card.

It is another object of the invention to provide a combination of a novel teaching machine and novel information storage and programming units in the form of a plurality of cards, each of which includes a photographic record of the information, indexing openings formed therein, and a printed electrical circuit for directing advance or regress by said machine to select another card of said plurality. Said machine includes means for receiving a plurality of cards, as a set or deck, means for selecting one of said cards, means for moving the selected card to an optical system for visually presenting the photographic portion of said card to the student, and answer-selecting means for energizing an indicating means and said card-selecting means through the printed electrical circuit portion of said card.

The need for so-called teaching machines has now been well established as an effective teaching aid for self-instruction, or to extend the number of students that a single teacher can instruct. Many different systems have been developed that are generally described as teaching machines. One summary of such machines is contained in AV Communication Review, vol. 8, No. 2, Supplement 1 (pages 12–17), published by National Educational Association, Department of Audio-Visual Instruction, 1201 Sixteenth Street, NW., Washington 6, D.C.

Teaching machines may be simple devices involving use of only paper and a pencil or stylus for indicating answers to printed material on the paper. In their more complex forms, they can use high-speed electronic computers for presentation of information and analysis of answers. In intermediate forms of these machines, information may be presented in graphic form, such as a photograph. In response to this information, the student pushes one of several answer buttons to actuate an electrical circuit. If the answer is correct, the machine advances to a new bit of information. If the answer is incorrect, it is desirable for the machine to regress to a different information bit. At the same time, success or failure is indicated to the student. The cycle is then repeated, up to the capacity of the storage system of the machine.

In one previously known form of such apparatus, a reel of photographic film, such as 35 mm. film, runs through an optical system, and the answer advances the film in sequence to the next frame if the answer is correct. If it is incorrect, an elaborately programmed regression is necessary, unless the answer is restricted to "yes" or "no." Hence, random access to information with this system is difficult to obtain, and if obtained, the next information bit is generally delayed several seconds while the machine "searches" for the correct film position.

In another machine of this type, random access may be had through punched business machine cards, but such a system requires a different type of information presentation, usually in typewritten form. The control circuits are also complicated, so that the initial cost of the unit is excessive.

The present invention incorporates all of the desired functions by means of the novel card members to provide photographic presentation of information, random access through indexing openings formed therein, and logic circuits for control of the advancing or regressing to the next bit of information through the printed electrical circuits thereon. Thus, a teacher may design a program in any subject to the learning ability of an individual student, and without regard to access time to succeeding bits of information, whether or not the previous answer was correct. The importance of the incorrect answer cannot be too heavily emphasized where multiple answers are possible, since the particular incorrect answer is a direct clue to what phase of the subject is not understood by the student. When such a clue is detected, prompt work on that portion of the subject, as by immediate access thereto in the machine, is highly desirable.

In accordance with the present invention, random access to the next bit of information is obtained by using the card itself as the closure of a control loop. The control loop begins with the student pushing an electrical button to select one of a plurality of answers when a question is asked about the information projected from a photograph on a card. One of the electrical circuits printed on the same card then directs selecting mechanism to choose the next appropriate card; the cards also carry their own selection means in the form of indexing holes or slots formed therein, so that only one card of an entire deck, such as 64, 128 or 256 cards, is selected and immediately positioned in the optical system of the machine.

Further objects and advantages of the present invention will become apparent from the following detailed description when taken in conjunction with the accompanying drawings which form an integral part of the present specification.

In the drawings:

FIG. 1 is a perspective view of a desk-type teaching machine in accordance with the invention.

FIG. 2 is an elevation view, partly in phantom, of the right side of the machine to show the opening of the top for service and to indicate the access door for insertion of a deck of information cards.

FIG. 3 is a top plan view of the teaching machine of FIG. 1 with the top cover removed.

FIG. 5 is a plan view partially in section of the card selector drum, operating relays, and card pickup bars to select the correct card from the deck.

FIG. 6 is a perspective view of one of the card pickup bars shown in FIG. 5.

Figure 8:
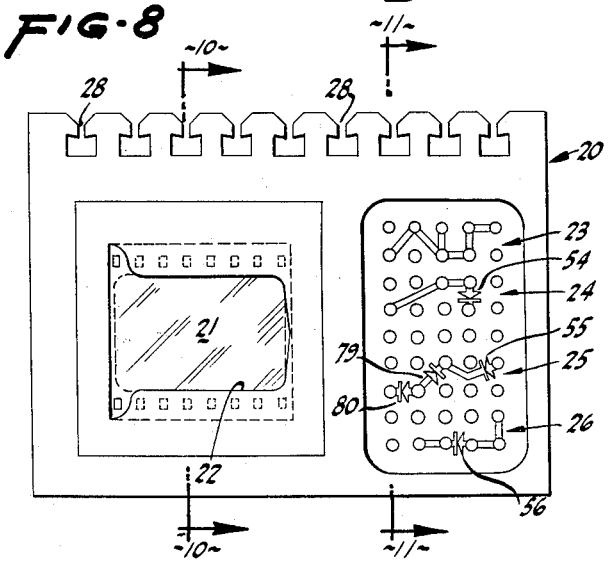
FIG. 8 is a plan view of one form of a card constructed according to the invention to include not only information and potential answers as a photograph, but also a random selection means in the form of key slots in the card and logic circuits to program the next, proper card in the form of a "printed" or integral electrical circuit on the card itself.
Figure 9:
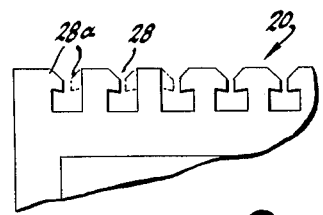

FIG. 9 indicates the system for programming the key slots of each card similar to that shown in FIG. 8.

Figures 10, 11:
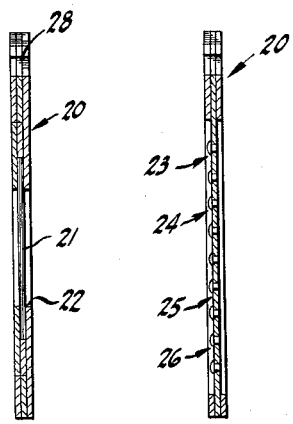

FIG. 10 is an elevation view in the direction of arrows 10—10 in FIG. 8.

FIG. 11 is an elevation view taken in the direction of arrows 11—11 in FIG. 8.

Figure 12:
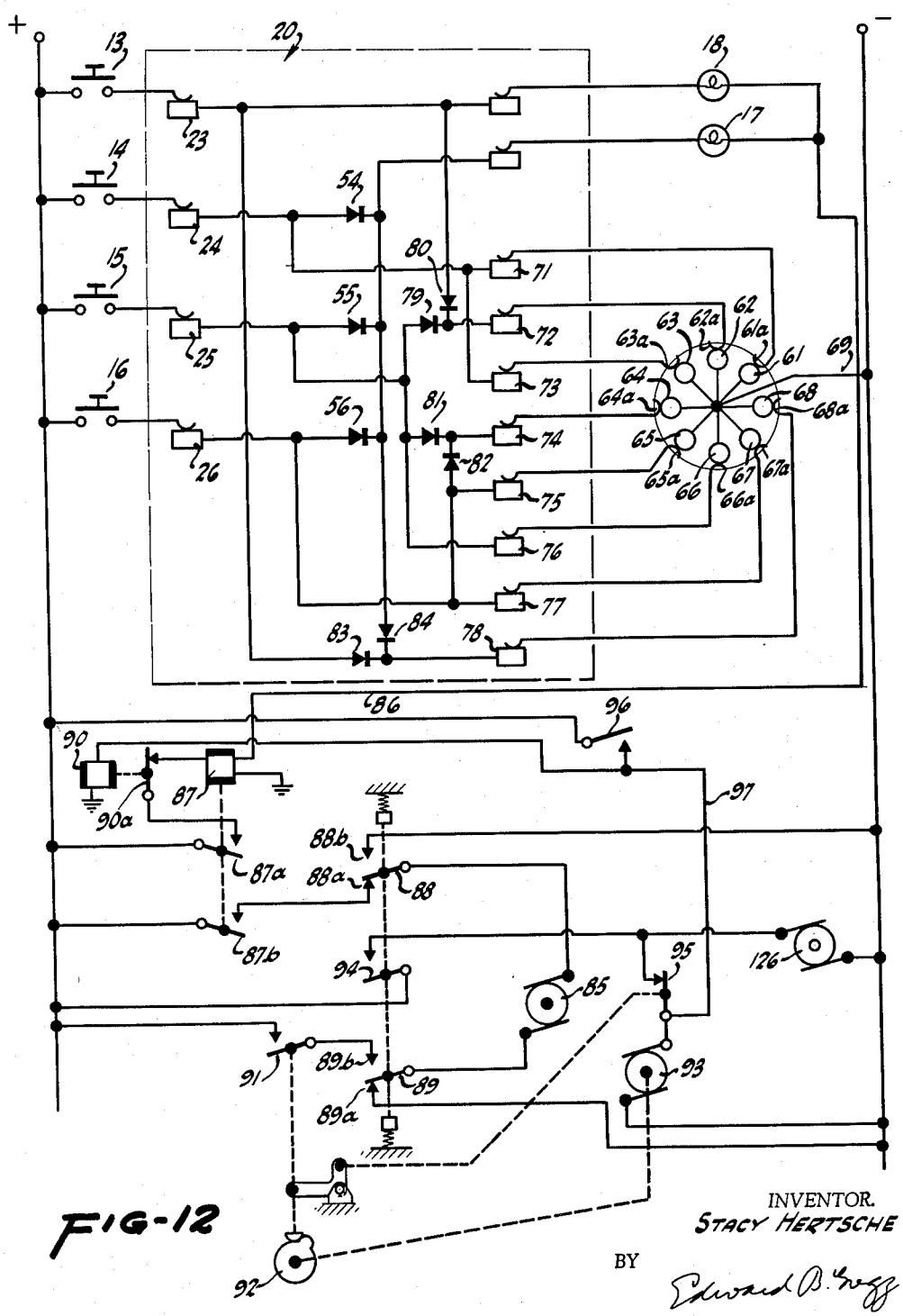

FIG. 12 is an electrical schematic diagram of preferred form of circuit for operating the teaching machine of FIGS. 1 to 7.

Figure 13:
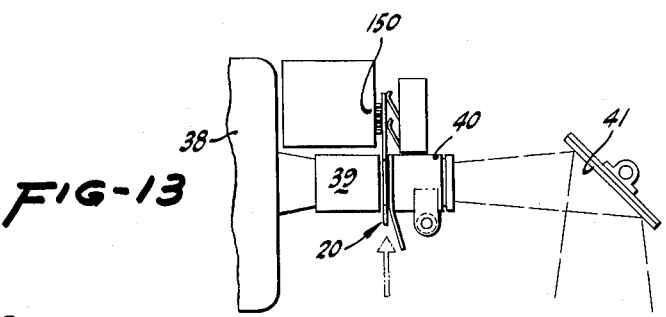

FIG. 13 is a partial plan view of the projection and electrical contact system for a card while in the display position.

FIGS. 14, 15 and 16 are plan views of alternative forms of cards suitable for use in the present invention.

FIG. 17 is an elevation view in the direction of arrows 17—17 in FIGURE 14.

FIG. 18 is an elevation view in the direction of arrows 18—18 in FIG. 16.

Referring now to the drawings, FIGURE 1 shows a desk-type teaching machine according to the invention. As indicated, screen 11 is mounted on cover 12 to present visually any information that can be photographically recorded, with a plurality of possible answers, say four. One of the four answers is then selected by the student's depressing one of the push buttons 13, 14, 15 or 16. The "reward" is instantly indicated visually by lighting of one of the indicators, red light 17 or green light 18. If desired, of course, audio signals can also be used. At the same time, in accordance with the invention, and entirely dependent upon which answer is selected, the next proper "bit" of information, and a different set of possible answers, are presented to the student. Specifically, a wrong answer can be graded in degree of wrongness and a proper regressive information bit or set of bits presented. The system will regress without loss of "search" time, since the machine has random access to any bit in a set.

For an understanding of this random access to any bit and as a basis for explaining the operation of the elements of my teaching machine, reference is now made to FIGS. 8 to 11, inclusive. As there shown, a card, or plate member 20, formed of two sheets of cardboard, supports a photographic record, such as a 35 mm. slide 21, in an opening 22. Slide 21, of course, includes the information that is to be taught, such as a mathematical formula. Slide 21 also contains four possible answers. It will be seen that the right-hand side of card 20 includes four different portions of electrical circuits 23, 24, 25 and 26. These circuits are formed integral with card 20, and are interconnected with the contacts of push buttons 13, 14, 15 and 16, respectively, on cover 12 (FIG. 1). Integral, or printed circuits 23–26 are also logic circuits that direct the selection of the next card, as required by the selected push button. Card 20 also has formed integral therewith a plurality of keyholes or slots in its upper edge. These openings are used as both selection and transport means to bring the card into the position shown in FIG. 13 where slide 21 can be optically projected and circuits 23–26 connected to the contacts of push buttons 13–16. While the number of slots may be varied, the nine holes shown are sufficient to permit random access to and transport of any single card in a deck of two hundred fifty-six cards or less by use of any two slots at a time as "keys." Obviously, any other form of key, such as squares, holes, or other sensitive areas on the card can be used as the selection and transport means. FIGURE 9 indicates the way in which the tabs 28a may be clipped off on either right or left side of slot 28.

FIGS. 14 to 18 illustrate several alternatives of each of the three features and functions performed by card 20. Among these alternatives is the base material for its construction. FIGS. 14 and 17 show "card" 20a formed of a magnetic material, such as iron, with a suitable insulating coating or covering 30 on which are mounted etched copper circuits 23, 24, 25 and 26. The purpose of such a base material is to permit use of electromagnets to hold card 20 during transport and positioning. In FIG. 15, card 20b is formed of photographic film so that slide 21 is integral therewith. Circuits 23–26 are "printed" on card 20b. In FIGS. 16 and 18, card 20c is cardboard, or other paper or plastic, with a slide 21c removably mounted in opening 22 as by tape 29. Circuits 23–26 may be wires 31 secured to openings 32 in card 20c.

With the foregoing construction of card elements and their alternate constructions in mind, the following description of my teaching machine will be made with reference to use of cards of the kind shown in FIG. 8. As indicated in both FIGS. 2 and 3, a deck 35 of cards 20 is supplied to the machine in a tray 36 that desirably inserts through trap door, or panel, 37 on cover 12. While tray 36 could also be inserted by lifting cover 12 to the position shown in phantom in FIG. 2., it is desirable to restrict access to the operating elements of the machine.

In correspondence to the three essential features of cards 20, there are three primary operating units in the machine. These are: (a) The optical projection system for displaying the photographic material on the card, (b) the electrical circuits to indicate whether the answer is right or wrong and to initiate operation of the random selector and transport mechanism, and (c) the card selection and transport mechanism to choose only the one correct card from deck 35 and move it into optical and electrical registry with (a) and (b) respectively.

*Optical system*

Figure 4:
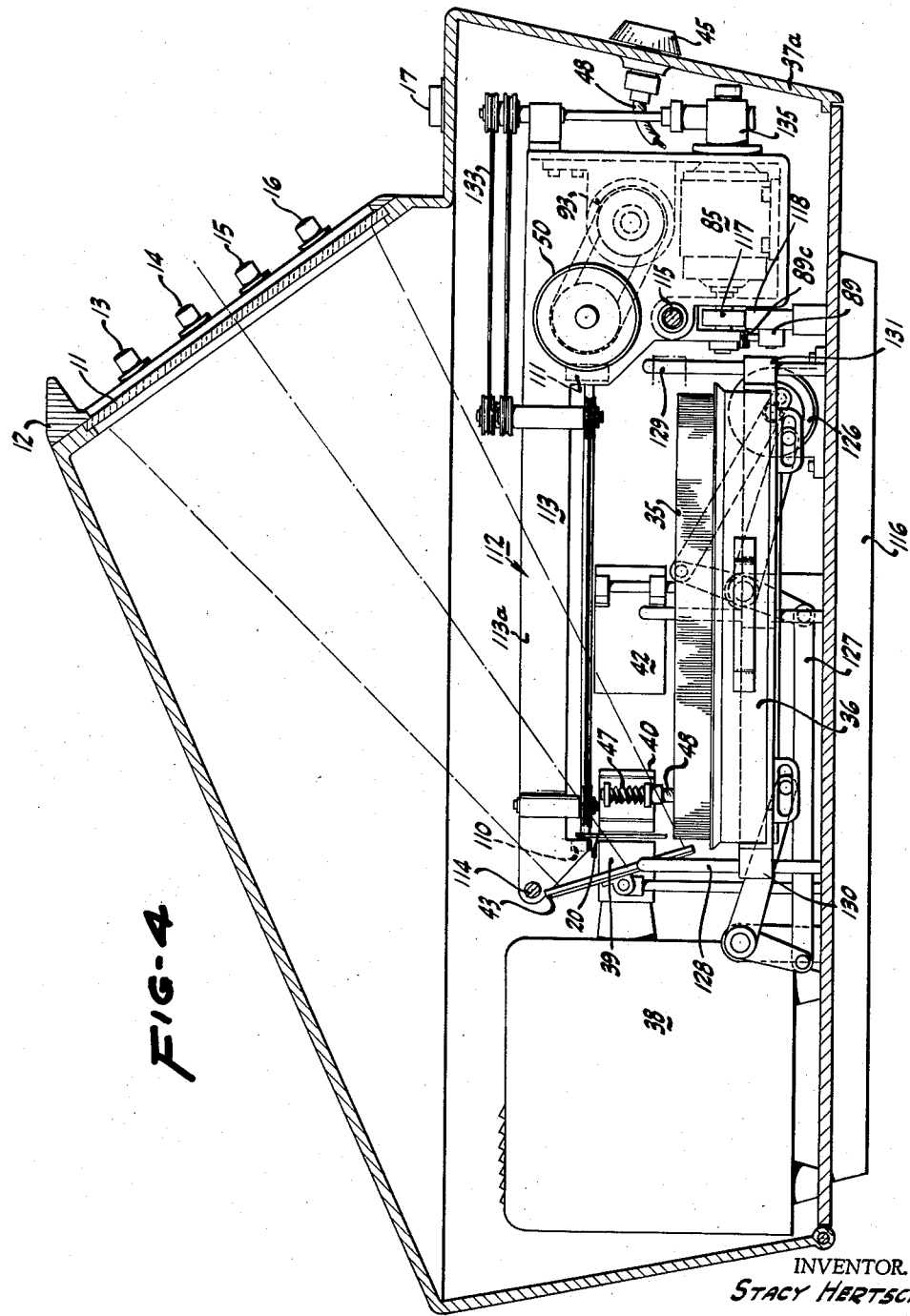
FIG. 4 is an elevation view of the right hand side of the teaching machine shown in FIG. 1 with a side portion of the cover removed.

The optical system for displaying the photographic material is best seen in FIGS. 3, 4, and 13. As shown in FIGS. 3 and 13, projector unit 38, including the usual lamp (not shown) and a condensing lens system, indicated generally as 39, illuminates the photographic portion of card 20. The image thereof is projected onto ground-glass screen 11 (FIG. 4) by way of objective lens 40 and mirrors 41, 42, and 43. As indicated, the mirrors are disposed at angles and elevations within cover 12 to make maximum use of its volume. Fine focus of the objective lens 40 in the projector system may be adjusted by rotation of control knob 45 on panel 38. Focus knob 45 rotates a worm-and-gear arrangment 47 connected to lens 40 by flexible cable 48.

With the foregoing arrangement, the photographic information, including both information "bits" and questions, are projected from card 20 onto optical screen 11 for use by a student. In response to the questions asked, the student will depress one of the buttons 13, 14, 15, or 16 to actuate an electrical circuit, as will now be described.

*Electrical circuits*

As indicated above, cards 20 carry on their surface, or affixed thereto, the basic control, or logic, circuits 23, 24, 25, and 26 for directing the present machine.

One of these circuits, which corresponds to the correct answer, interconnects the corresponding push button 13, 14, 15 or 16 to green light 18 on the cover 12.

The other three circuits all interconnect the remaining three push bottons to a power source and red light 17, corresponding to a wrong answer. While the three circuits may be mechanically isolated, as by extra contacts on push buttons 13, 14, 15, and 16, I prefer to isolate them electrically as indicated in FIG. 12. As there indicated, card 20 includes contact rectifiers 54, 55, and 56. These rectifiers may also be formed by coating, painting, or molding on the surface of card 20, if desired. Their function, of course, is to assure that an electrical potential applied to one circuit, say 24, by push botton 14, does not energize the same circuits as push buttons 15 or 16. Additionally, these rectifiers reduce the number of sliding contacts that must be completed when card 20 enters the display or project position, as in FIG. 13. Hence, only a total of 14 sliding contacts need be made upon entry of each card.

The selection of one of the four push buttons also directs the selection of the next card for display through the logic circuit on the presented card and the selector mechanism. In the present embodiment, this is accomplished by a set of eight relays identified as 61, 62, 63, 64, 65, 66, 67, and 68 in FIG. 12. Their location and operation to sort and select cards will be described below in connection with FIGS. 5, 6, and 7. As shown in FIG. 12, they are actuated through contacts 71, 72, 73, 74, 75, 76, 77, and 78, respectively, on card 20. These electrical contacts are also energized by the selector push buttons 13, 14, 15, and 16, and where needed for isolation of relays 61 to 68, rectifiers, such as 79, 80, 81, and 82, are used. One side of all relays 61 to 68 is connected in common to ground, or return, circuit to the power supply, as by line 69. It is, of course, understood that the logic circuits for each card 20 in a deck will be different from those for all other cards in the deck. Thus FIG. 12 is only illustrative of the principles of the invention. As will be explained below, relay 68 controls transport of the cards from tray 36 to the project position. The lamps 17 nd 18 are connected to the common, or ground connection through line 86 and relay 87. Therefore, when an answer is selected, not only is one of the lamps 17 or 18 illuminated, but the relay 87 is also energized to initiate operation of the carriage drive motor 85 through said relay and limit switches 88 and 89 that stop travel of carriage 112 at its "dwell" and "sort," or "select," positions. Limit switches 88 and 89 also reverse motor 85 so that it automatically traverses between the two positions.

Operation of this control circuit is as follows: With relay 87 energized, it closes a holding circuit through its contact 87a and contacts 90a of end-cycle relay 90. At the same time, carriage traverse motor 85 is started in one direction, say clockwise, by power supplied through contact 87b, contact 88a of limit switch 88 to motor 85. The return circuit is through contact 89a of limit switch 89. At the end of the carriage travel from right side (dwell) to the left side (sort), limit switches 88 and 89 are thrown to their up (as seen in FIG. 12) position to complete a reversing circuit for motor 85 through contacts 88b and 89b. However, it will be seen that this reverse circuit is under the control of limit switch 91 which is operated by cam 92 on card selection drum motor 93. Switch 91 is so controlled to permit completion of the card sort function before the carriage returns to the left side of the machine to project the photographic information. Drive of select drum motor 93 is through limit switch 94, which is mechanically coupled to limit switches 88 and 89. Switch 94 is operative only while the carriage is at the left side (up position for switches 88 and 89), so that motor 93 will not rotate while the carriage is in motion.

At the end of the card selection process, cam 92 rotates to close mechanically switch 91. This energizes carriage drive motor 85 for its reverse trip. At the same time, cam 92 opens switch 95 to stop drum motor 93 and thus permit cam 92 to hold these circuits. The complete cycle is terminated by another limit switch 96 which energizes relay 90 to open its contact 90a to interrupt relay 87. At the same time, limit switch 96 momentarily energizes motor 93 through line 97 to rotate cam 92 sufficiently to reset limit switches 91 and 95 for the next cycle. This final rotation also brings the contacts 61a, 62a, 63a, 64a, 65a, 66a, 67a and 68a on drum 50 into circuit with relays 61–68, respectively. While FIG. 12 for the sake of simplicity, has been shown as a D.C. circuit, it is equally applicable in principle to an A.C. circuit, which will usually be preferred because of the greater availability of such a source.

*Card selection and transport mechanism*

As indicated in FIGS. 3 and 5, card 20 is supported in the project position by selector bars 101 and 109. Bars 101 and 109 in this view are in their transport and dwell positions; that is, they are horizontal to lock the end slots 28 of card 20. The remaining selector bars 102–108 are vertical in this position. Bars 101–109 are rotatably supported by ball bearings 98 and friction rings 99, FIG. 5 in the cross beams 110 and 111 at opposite ends of the bars. The ends of the bars such as 101 are constructed as shown in FIG. 6. Groove 101a forms a race for a friction ring which holds bars 101, etc. in their last position until physically rotated by lugs 61b, as will be described below. The opposite end 101b of each rod is also cylindrical to support bearing 98. Beams 110 and 111 in turn are mounted on a carriage arrangement that comprises an overhead frame member 113 including side members 113a and 113b that support cross beams 110 and 111 beyond the ends of the card support portions of tray, or bin, 36. Frame 113 also supports selector drum 50, selector drum motor 93, and carriage drive motor 85 on suitable mounting brackets, as indicated best in FIGS. 3 and 4. Support of carriage 112 in the machine is provided by a pair of transverse guide rods 114 and 115 secured to supports mounted on base 116 for the whole machine.

As indicated in the description of the electrical circuits, carriage drive motor 85 traverses carriage 112 from its dwell to select positions, and return, by driving a gear, or friction wheel, 117 that engages track 118. Limit switches 88 and 89 may be actuated by wheel 117 or by cam 89c supported on carriage 112.

As best seen in FIG. 5, selector drum 50 is mounted for rotation about an axis 50a that is perpendicular to and in the same general plane as selector bars, or arms, 101–109. The primary function of drum 50 is to selectively drive bars 101–109, at the proper times, from their vertical, or card-dropping position, as indicated by bars 102, 103, 104, 105, 106, 107 and 108, in FIGS. 3 and 5, to their card-engaging or horizontal position, as indicated by bars 101 and 109 only in these same views. As seen in FIGURES 5 and 6, the longitudinal axis of the card supporting portion of the bars 101–109 is displaced from the pivot axis of the bars whereby the bars assume a vertical position by reason of force of gravity (and the weight of cards supported thereon when the bars are in a horizontal card-engaging position) when not actuated to a horizontal position by lug members 61b, 62b, 63b, etc. in a manner described hereinbelow. If desired means not shown could be employed to assist in returning the bars to a vertical position when not actuated to a horizontal position by the lugs.

For a description of how selector drum 50 actuates bars 101 to 109, reference is now made to FIGS. 5 and 6. As best seen in FIG. 5, drum 50 supports eight relays 61 to 68 around its inner circumference and at one end thereof. The electrical circuit, as described in connection with FIG. 12, includes contacts 61a, 62a, 63a, etc., that respectively connect to the coil for relays 61, 62, 63, etc. The ground, or opposite, terminal for each relay is through shaft 120, on which drum 50 rotates. Alternatively, a commutator, with a brush and ring for each relay, can be constructed integral with shaft 120. Because the relays need only be actuated once in each cycle, a continuous holding current is not necessary in the present embodiment.

Figure 7:
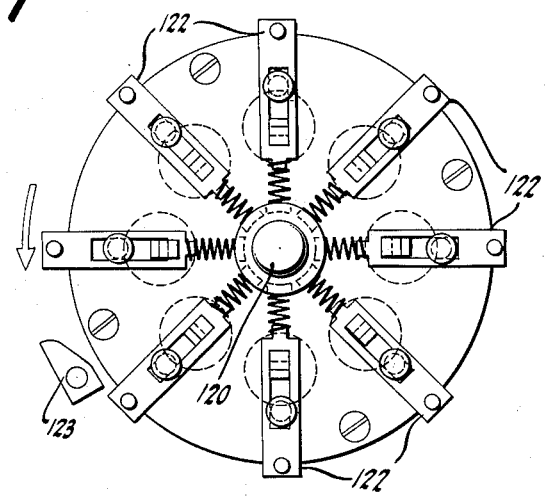
FIG. 7 is an end view of the selector drum of FIG. 5.

FIG. 5 indicates, in a cross-sectional view of drum 50, the mechanical connections between the relays and lug members 61b, 62b, 63b, etc., that protrude through the openings 61c, 62c, 63c, etc., in the surface 50b of drum 50. It will be noted that relay 68 includes an auxiliary lug 68d that extends through another opening 68e in drum 50. As indicated, lugs 61b, 62b, 63b, etc., move axially relative to their openings 61c, 62c, 63c, etc., when relays 61, 62, 63, etc., respectively actuate rods 61f, 62f, 63f, etc., against the action of springs 61g, 62g, 63g, etc. The opposite ends 61h, 62h, 63h, etc., of rods 61f, 62f, 63f, etc., include a catch member 122 for each rod, so that when it is once actuated, to the right in FIG. 5, by its relay coil the rod will retain the actuated position until released. All rods may be released simultaneously after a single card is selected from the deck, or as in the present embodiment, shown in FIG. 7, each rod is released sequentially by a single cam 123 that operates against catches 122 as lugs 61b etc. rotate past their selecting positions. As seen in FIG. 7, the selection position for lugs 61b etc., is at the nine o'clock position as viewed at the end of drum 50.

The function of lugs 61b, 62b, 63b, 64b, etc., is to engage the flat or cam ends 101c, 102c, 103c, etc., of selector bars 101, 102, 103, 104, 105, 106, 107, 108 and 109. As shown in FIG. 6, cam ends 101c, 102c, 103c, etc., are semicircles and so formed with regard to the turning axis of each bar 101, 102, 103, etc., that the bar may be turned 90°, either clockwise or counter-clockwise, depending upon the position of lugs 61b, 62b, 63b, etc., when drum 50 rotates relative to the bank of bars 101 to 109. As soon as the lugs disengage the cam ends, the selector bars swing back into a vertical position. The circumferential spacing of the lugs on the drum and the relative dimensions of the lugs and cam ends are such that during the sorting process when one selector bar is turned 90° from the vertical, a second selector bar is turned 90° prior to release of the one selector bar and its subsequent return to a vertical position to prevent dropping of all of the cards back into the tray during sorting.

Thus, with the relays in their set positions by the electrical circuits, including the circuit on card 20 in the project position, and carriage 112 in the card-select position, all of the index openings in the deck of cards 20 are brought into engagement with the selector bars. This is accomplished by raising the card support tray 36 to the phantom position shown in FIG. 4. Tray 36 is raised by motor 126 through a bell-crank, and mechanical linkage system 127. Vertical motion of tray 36 is assured by guide pins 128 and 129 and bushings 130 and 131. With tray 36 lifted to engage bars 101 to 109, drum 50 begins its single cycle of rotation. Dependent upon the card to be selected, drum 50 and lug 61b will position selector bar 108 in a card-engaging position in a card slot. The tray 36 is then lowered through the mechanical linkage 127. With the tabs on only one-half of the cards in engagement with the horizontal bar 108 (the tabs on the other one-half having been removed in coding the slots 28) the bar 108 will support the cards with the tabs at this position while the de-tabbed cards will remain in the tray. Next, lug 62b will position selector bar 107 in either one of two horizontal positions. Then, the lug 61b will leave the cam surface 101c thereby permitting the bar 108 to return to a vertical card-dropping position. At this time one-half of the suspended cards will drop to the bottom of the tray while the other half remain suspended by the bar 107. Again, the coding of the slots 28 determines which cards will remain suspended and which will be dropped. The process is then repeated with lugs 63b, 64b, 65b etc. and associated bars 106, 105, 104, etc., with the cards being divided until a single card remains. The final selection is made with relay 68 which controls the positioning of a pair of lugs 68b and 68d. The lug 68d is pivotally mounted on a pin secured to the drum 50 and when the rod 68f and attached lug 68b is moved to the right, as viewed in FIGURE 5, the lug 68d is pivoted to the left. Thus, both the bars 101 and 109 are pivoted to a horizontal position to support the remaining single card; the end notches 28 in the cards being properly coded to provide for such support. (It will be seen that with the relay 68 in a de-energized condition and the rod 68f moved to the left, the lugs 68b and 68d are in the phantom line position.) By this time the tray 36 is lowered a sufficient distance to permit the single remaining card to be moved horizontally. This card will be moved toward crosshead 110 by rubber or flexible fingers 132 driven by pulley and cord assembly 133 as carriage 112 moves from the select to the dwell position. A suitable gear reducer 135 connects pulley and cord means 133 to carriage drive motor 85. Alternatively, an inclined plane can be positioned so that as carriage 112 moves to the project position, card 20 bears against the plane and is forced forward to crosshead 110. The purpose of either of these arrangements is to assure that card 20 will enter the space between lenses 39 and 40 and "wipe" the arms 150 (FIG. 13) of contacts 23–26 and 71–78 (FIGURE 12) correctly as it enters the project position. As mentioned above, bars 101 and 109 lock the outer notches in card 20, so that it is firmly held during transport and insertion.

Desirably, each set of cards is initiated and terminated by a single or common card that will be interchangeable between all sets of cards. Its function is to initiate selection of the first information card without complicating the starting circuits or adding to the mechanical complexity of the present machine. The start and end of each deck may thus be displayed photographically.

As one means for assuring registry between cards 20 and the lens-electrical contacts, it may be desirable to form said cards of a magnetizable material, such as soft steel, as seen in FIG. 14. With such an arrangement, small electromagnets may be used adjacent the "project" opening. A suitable circuit to de-energize the magnet, as well as magnetize it, would assist removal of the card and aid its return to tray 36 after use. Such cards are returned by release of bars 101 and 108 after the carriage is in the select position and before selection occurs.

*Operation*

In operation, with the card 20 as shown in FIGURE 12 in the project position, if the correct button 13–16 (as determined by circuitry on the card) is pushed, the lamp 18 is illuminated. With the illustrated card, push button 13 provides the correct answer, and when this button is depressed, the relays 62 and 68 are energized through the diodes 80 and 83, and contacts 71 and 78, thereby moving lugs 62b and 68b to the right hand positions and the lug 68d to the left hand position as viewed in FIGURE 5.

Regardless of which button is depressed, the relay 87 is energized thereby closing the circuit to the carriage drive motor to cause the carriage to move to the card select position. In this position, the limit switches 88, 89 and 94 are moved to the card-select position and the motor 93 for the drum 50 is energized to rotate said drum. The card 20 is dropped back into the tray at the rear end thereof and the card selection process takes place, in the manner described above, as the drum 50 is rotated and the tray 36 raised and again lowered by the tray motor 126. At the end of the card selection process, the cam 92 (FIGURE 12) closes the reverse circuit for the carriage drive motor 85. At the same time the switch 95 in the drum motor circuit is opened by the cam 92 to stop rotation of the drum 50. A limit switch 96 is momentarily energized to interupt relay 87 and energize the drum motor 93 to properly position the movable elements of the contacts 61a, 62a, 63a, etc. with the associated fixed contact elements. As the carriage moves from select position, the one selected card is moved into position for entry between the lenses 39 and 40. When in project position, the limit switches 88, 89 and 94 are moved to the project position to open the reverse energization circuit for the carriage drive motor 85 to stop the motor, and to condition the circuit for another cycle when a button 13–16 is again depressed.

If a wrong answer push button 13–16 is depressed the lamp 17 is illuminated and the above-described cycle is performed except different relays 61–68 are energized and, as a result, a different card is selected. For example, if the push button 14 is depressed, the relays 61, 63 and 68 will be energized to move the lugs 61b, 63b and 68b to the right (FIGURE 5) and the lug 68d to the the left. This results in the selection of a different card than when the relays 62 and 68 were energized with the correct answer. Again, when the button 14 is depressed, the relay 87 is energized (this time through the lamp 18) and the sorting process described above is repeated. Since the relays which are energized, or left de-energized, depend both upon the electrical circuit means carried by the cards and which button is depressed, the above description of the operation of the machine is illustrative for only the card 20 shown in FIGURE 12. Other cards with different electrical circuit means may serve to energize different relays 61-68 and select a different card when a button 13-16 is depressed.

While various modifications and changes in both the form of cards 20 and their method of use in my educational machine as well as in its structure will occur to those skilled in the art, all such modifications and changes within the scope of the appended claims are intended to be included.

I claim:

1. A teaching machine comprising an optical system for visually displaying photographically recorded information to a student; means for positioning an information card including a photograph in said optical system; a plurality of electrical contacts adjacent said positioning means; a plurality of selector switch means, said selector switch means being operable by the student in response to information on the information card; electrical circuit means carried by said card and positioned thereby between said plurality of selector switch means and said electrical contacts; and means operable in response to operation of one of said selector switch means to actuate said positioning means to remove one card and replace it with another card; the selection of said other card being in accordance with said electrical circuit means on the first presented card.

2. A teaching machine comprising an optical system for visually displaying reproducibly recorded information to a student; means for positioning an information card including a reproducible record in said optical system; a plurality of electrical contacts adjacent said positioning means; a plurality of selector switch means, said selector switch means being operable by the student in response to information on the information card; electrical circuit means carried by said card and positioned thereby between said plurality of selector switch means and said electrical contacts; and means operable in response to operation of one of said selector switch means to actuate said positioning means to remove one card and replace it with another card; the selection of said other card being in accordance with said electrical circuit means on the first presented card.

3. The teaching machine as recited in claim 1 including a deck of information cards in random order which deck includes the said other card, the said other card being removed from the deck from any random location therein.

4. A teaching machine comprising a deck of information cards, each card including a photograph and a plurality of independent electrical circuit means, an optical system, means selecting from the deck of information cards one of said cards from any random location in the deck, means for moving the selected individual information card between said deck of cards and a viewing position in said optical system, means for visually displaying the photographic information on said information card to a student when the card is moved to viewing position in said optical system, a plurality of independent selector switch means operable by the student in response to the information displayed, and means connecting the independent selector switch means to the selecting means through the said independent circuit means on the card to which the student responds.

5. The teaching machine as recited in claim 4 wherein the means selecting from the deck of information cards one of said cards includes a plurality of selector bars pivoted between a vertical position and one of two horizontal positions, and means forming coded notches in the cards of the deck of information cards through which the selector bars are adapted to extend.

6. The teaching machine as recited in claim 5 wherein the selected individual information cards are supported by the selector bars during movement between the deck of cards and optical system.

References Cited by the Examiner
UNITED STATES PATENTS

| | | | |
|---|---|---|---|
| 2,084,848 | 6/37 | Lasker | 235—61.12 |
| 2,484,642 | 10/49 | Paris | 235—61.12 |
| 2,564,089 | 8/51 | Williams et al. | 35—9 |
| 2,909,851 | 10/59 | Haddock | 35—9 |
| 2,965,975 | 12/60 | Briggs | 35—9 |
| 2,997,793 | 8/61 | Kelly | 35—9 |
| 3,052,041 | 9/62 | Luxton et al. | 35—9 |

JEROME SCHNALL, *Primary Examiner*

L. SMILOW, *Examiner.*